(12) United States Patent
Sato et al.

(10) Patent No.: US 10,319,976 B2
(45) Date of Patent: Jun. 11, 2019

(54) CABLE FIXING STRUCTURE

(71) Applicant: HONDA MOTOR CO., LTD, Minato-ku, Tokyo (JP)

(72) Inventors: Masahiko Sato, Wako (JP); Tsuyoshi Kobayashi, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/782,897

(22) Filed: Oct. 13, 2017

(65) Prior Publication Data

US 2018/0108894 A1 Apr. 19, 2018

(30) Foreign Application Priority Data

Oct. 19, 2016 (JP) ................................. 2016-205103

(51) Int. Cl.
| | |
|---|---|
| H01R 4/72 | (2006.01) |
| H01M 2/20 | (2006.01) |
| H01M 2/06 | (2006.01) |
| H01R 13/422 | (2006.01) |
| H01R 13/58 | (2006.01) |
| H01M 8/02 | (2016.01) |
| H01R 12/62 | (2011.01) |

(52) U.S. Cl.
CPC ............... *H01M 2/20* (2013.01); *H01M 2/06* (2013.01); *H01R 13/422* (2013.01); *H01R 13/582* (2013.01); *H01R 13/5808* (2013.01); *H01M 8/02* (2013.01); *H01R 4/72* (2013.01); *H01R 12/62* (2013.01)

(58) Field of Classification Search
CPC . H01M 2/06; H01M 2/20; H01M 8/02; B60R 16/0215; H01R 13/582; H01R 13/422; H01R 13/5808; H01R 4/72; H01R 12/62; H01B 7/08; H05K 1/118
USPC .......... 174/268, 254, 117 F, 117 FF, 117 AS, 174/113 R; 439/495, 499; 361/749
See application file for complete search history.

(56) References Cited

U.S. PATENT DOCUMENTS

| | | | |
|---|---|---|---|
| 6,340,199 B1 | 1/2002 | Fukumoto et al. | |
| 2005/0011665 A1* | 1/2005 | Youngers | H01B 7/041 174/117 F |

FOREIGN PATENT DOCUMENTS

| | | |
|---|---|---|
| CN | 102468459 | 5/2012 |
| JP | 04-081460 | 7/1992 |
| JP | 2000-177392 | 6/2000 |
| JP | 2009-211981 | 9/2009 |
| JP | 2009-266474 | 11/2009 |

OTHER PUBLICATIONS

Chinese Office Action for Chinese Patent Application No. 201710971972.9 dated Sep. 5, 2018.

* cited by examiner

*Primary Examiner* — Steven T Sawyer
(74) *Attorney, Agent, or Firm* — Amin, Turocy & Watson LLP (57) ABSTRACT

A cable fixing structure of a fuel cell stack fixes together a connector housing containing a substrate and a flat cable joined to the substrate. The cable fixing structure includes a fixing part provided for the connector housing, and having a convexly curved surface, and a heat contraction tube configured to surround the flat cable and the fixing part, and press the flat cable against the convexly curved surface.

9 Claims, 7 Drawing Sheets

CABLE FIXING STRUCTURE

CROSS-REFERENCE TO RELATED APPLICATION

This application is based upon and claims the benefit of priority from Japanese Patent Application No. 2016-205103 filed on Oct. 19, 2016, the contents of which are incorporated herein by reference.

BACKGROUND OF THE INVENTION

Field of the Invention

The present invention relates to a cable fixing structure for fixing together a connector housing containing a substrate and a flat cable joined to the connector housing.

Description of the Related Art

As the cable fixing structure of this type, for example, Japanese Laid-Open Patent Publication No. 2009-266474 discloses a structure where a flat cable is sandwiched and held in a thickness direction of the flat cable, between two flat plate cable holders provided for a clamp part attached to a housing.

SUMMARY OF THE INVENTION

However, in the conventional technique like Japanese Laid-Open Patent Publication No. 2009-266474, since the flat cable is sandwiched and held in the thickness direction, between the flat plate cable holders, when a pulling force is applied to the flat cable in a longitudinal direction of the flat cable (pulling force in a direction to pull the flat cable from the connector housing), an excessive stress is applied to a solder part (joint portion), and electrical connection between the flat cable and the substrate may be interrupted undesirably.

The present invention has been made taking the above problems into account, and an object of the present invention is to provide a cable fixing structure in which, when a pulling force is applied to a flat cable in a longitudinal direction of the flat cable, it is possible to reduce the stress applied to a joint portion between a substrate and the flat cable, and suppress interruption of electrical connection between the flat cable and the substrate.

In order to achieve the above object, a cable fixing structure according to the present invention fixes together a connector housing containing a substrate and a flat cable joined to the substrate. The cable fixing structure includes a fixing part provided for the connector housing, and having a convexly curved surface, and a heat contraction tube configured to surround the flat cable and the fixing part, and press the flat cable against the convexly curved surface.

In the cable fixing structure, preferably, the convexly curved surface is expanded toward the flat cable in cross section which is perpendicular to a direction in which the flat cable extends, in an area where the flat cable and the fixing part are overlapped with each other.

In the cable fixing structure, preferably, in a state where the flat cable is curved in an arc shape along the convexly curved surface over an entire width of the flat cable, the flat cable is sandwiched and held between the convexly curved surface and the heat contraction tube, and part of the heat contraction tube covering the flat cable is curved along the flat cable curved in the arc shape.

In the cable fixing structure, preferably, the fixing part includes a plate piece having the convexly curved surface on one side in a thickness direction.

In the cable fixing structure, preferably, an adhesive layer is provided between the heat contraction tube and the flat cable.

In the cable fixing structure, preferably, the convexly curved surface and the heat contraction tube are positioned outside the connector housing.

In the cable fixing structure, preferably, the fixing part has a clearance surface extending from the convexly curved surface to the substrate, in a direction away from the flat cable.

In the cable fixing structure, preferably, the flat cable is electrically connected to a cell voltage detection terminal of each of power generation cells of a fuel cell stack, and a connection terminal is joined to the substrate, and the connection terminal is configured to be electrically connected to the connector of the cell voltage detection device.

In the cable fixing structure, preferably, the connector housing includes a first cover and a second cover that are separated in the thickness direction of the flat cable, and the substrate and the fixing part are provided at the first cover.

In the cable fixing structure, preferably, the clearance surface comprises a curved surface continuous with the convexly curved surface.

In the present invention, the flat cable is pressed by the heat contraction tube against the convexly curved surface. Therefore, when a pulling force in a longitudinal direction is applied to the flat cable, it is possible to reduce the stress applied to the joint portion between the flat cable and the substrate, and suppress the situation where electrical connection between the flat cable and the substrate is interrupted.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a cable fixing structure according to the present invention will be described in relation to a fuel cell system, with reference to the accompanying drawings.

Figure 1:
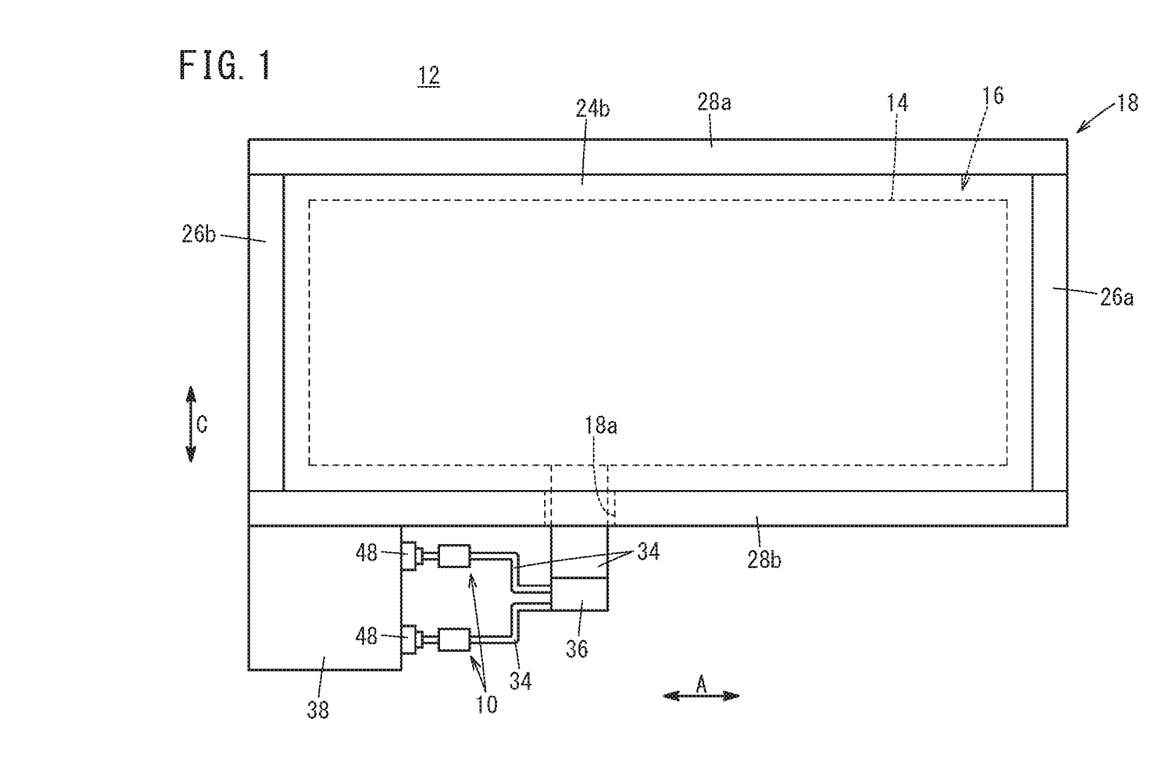
FIG. 1 is a side view showing a fuel cell stack equipped with a cable fixing structure according to an embodiment of the present invention.
Figure 2:
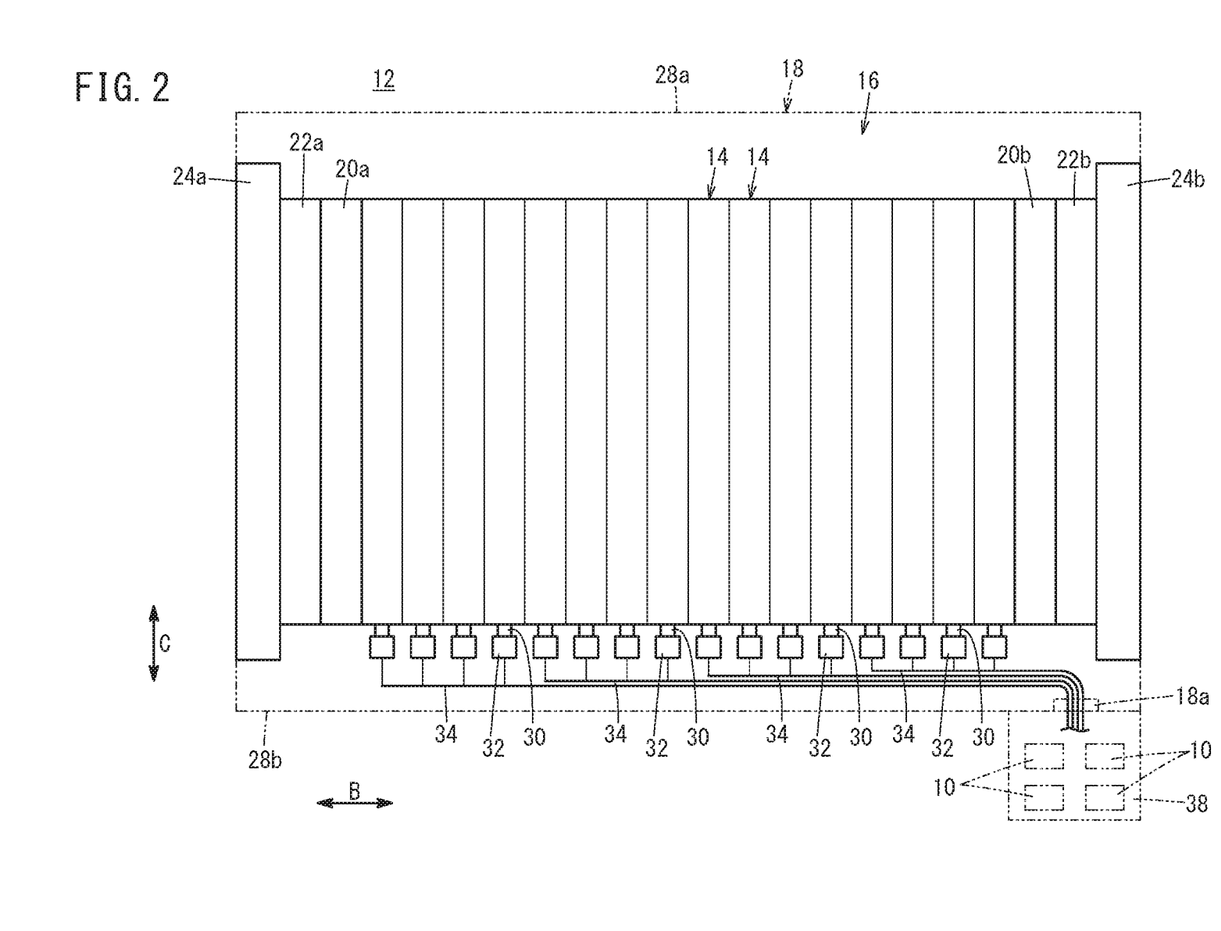
FIG. 2 is a view schematically showing the fuel cell stack.

As shown in FIGS. 1 and 2, for example, a cable fixing structure 10 according to the embodiment of the present invention is used for a fuel cell stack 12 mounted in a fuel cell vehicle (not shown). The fuel cell stack 12 includes a cell stack body 16 formed by stacking a plurality of power generation cells (unit fuel cells) 14, and an accommodating case 18 accommodating the cell stack body 16.

In FIG. 2, at one end of the power generation cells 14 in a stacking direction, a first terminal plate 20a is provided. A first insulating plate 22a is provided outside the first terminal plate 20a, and a first end plate 24a is provided outside the first insulating plate 22a. At another end of the power generation cells 14 in the stacking direction, a second terminal plate 20b is provided. A second insulating plate 22b is provided outside the second terminal plate 20b. A second end plate 24b is provided outside the second insulating plate 22b.

As shown in FIGS. 1 and 2, two sides (surfaces) of the accommodating case 18 at both ends in the vehicle width direction indicated by the arrow B are the first end plate 24a and the second end plate 24b. Two sides (surfaces) of the accommodating case 18 at both ends in the vehicle longitudinal direction indicated by the arrow A are a front side panel 26a and a rear side panel 26b. The front side panel 26a and the rear side panel 26b are laterally elongated plates. Two sides (surfaces) of the accommodating case 18 at both ends in the vehicle height direction indicated by the arrow C are an upper side panel 28a and a lower side panel 28b. The upper side panel 28a and the lower side panel 28b are laterally elongated plates.

As shown in FIG. 2, a cell voltage detection terminal 30 is provided for each of the power generation cells 14. A flat cable 34 (flat harness) is connected to each cell voltage detection terminal 30 through a connector portion 32. In the fuel cell stack 12 according to the embodiment of the present invention, a plurality of the flat cables 34 are provided.

The flat cables 34 are stacked together in the thickness direction, inside the accommodating case 18. The flat cables 34 are led out of the accommodating case 18 (specifically, lower side panel 28b) through an opening 18a formed in the accommodating case 18.

In FIG. 1, the flat cables 34 change their orientations by an orientation changer 36, outside the accommodating case 18, and are electrically connected to an ECU (Electronic Control Unit) 38. The ECU 38 is fixed to the outer surface of the accommodating case 18 (lower side panel 28b). The ECU 38 is configured to function as a cell voltage detection device, and the ECU 38 detects the cell voltage (electromotive force) of each of the power generation cells 14 during power generation.

Figure 3:
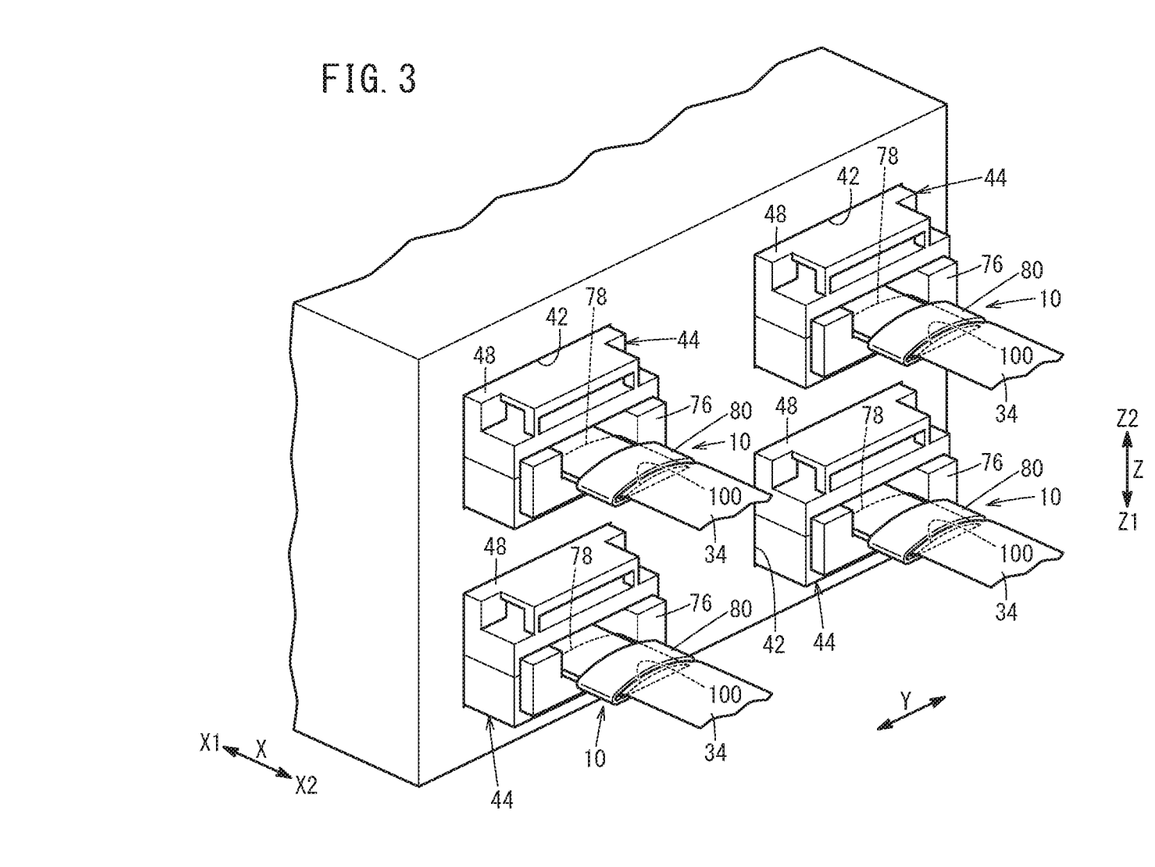
FIG. 3 is a perspective view showing cable fixing structure for fixing together a flat cable and a connector.

As shown in FIG. 3, a connector 44 is provided at an end terminal of each of the flat cables 34. The connector 44 can be inserted into a connector insertion slot 42 (see FIGS. 3 and 5) formed in a casing 40 of the ECU 38. The flat cable 34 is a band cable formed by combining a plurality of lead wires 34a arranged in parallel together (see FIGS. 4, 5, and 7). The connector 44 is a male connector which can be connected to a connector 46 (female connector) of the ECU 38 (see FIG. 5).

Figure 4:
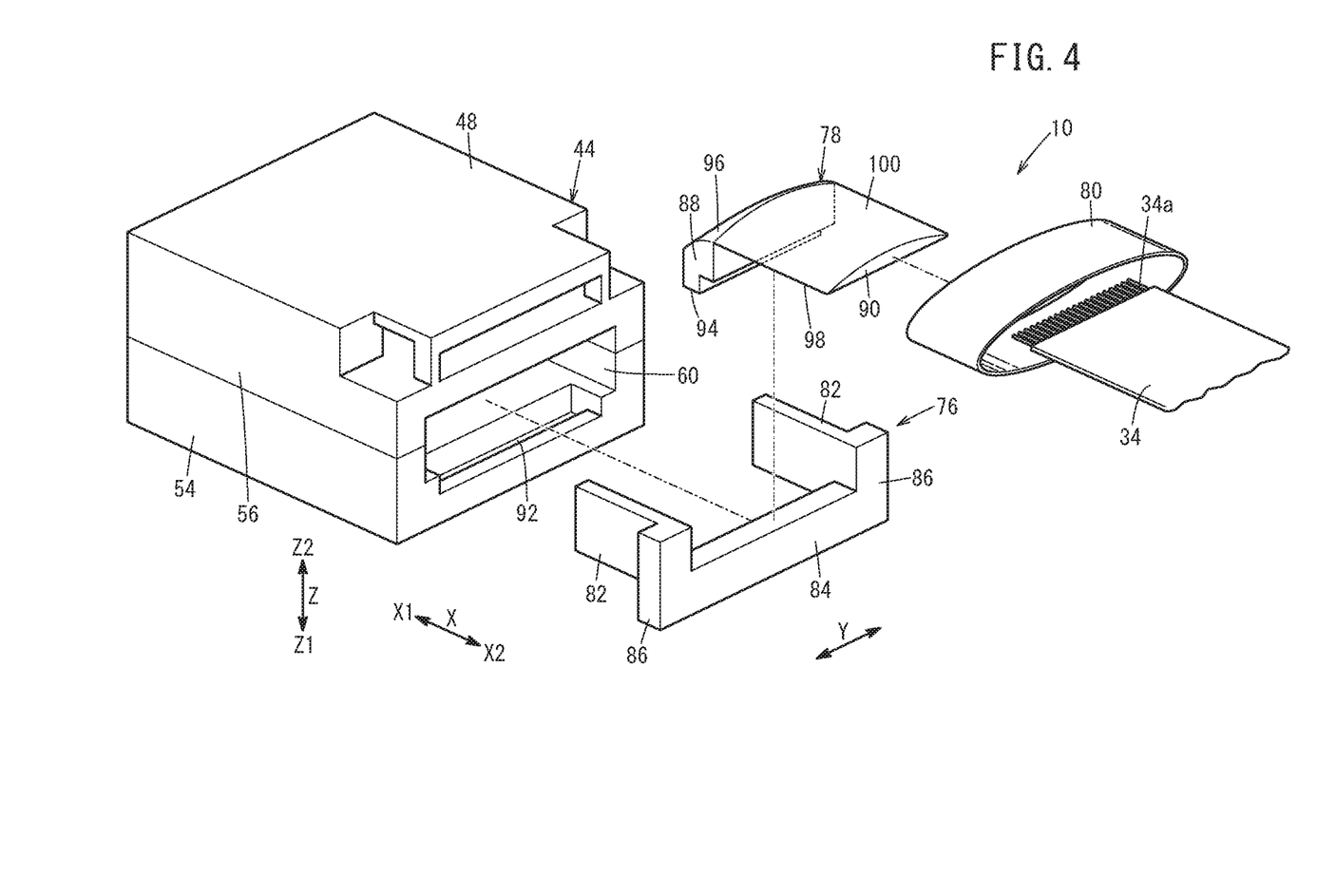
FIG. 4 is an exploded perspective view schematically showing the cable fixing structure.
Figure 5:
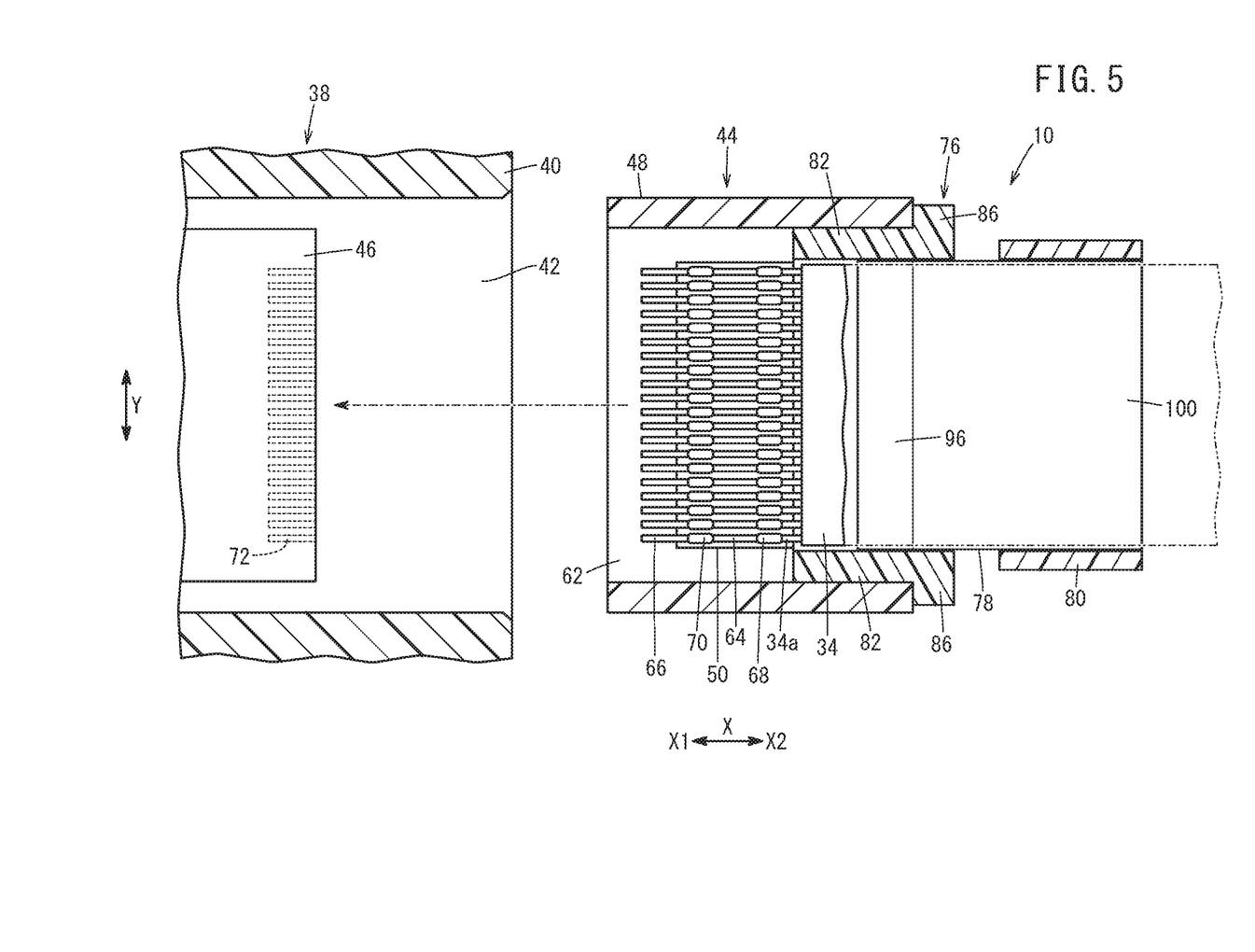
FIG. 5 is a cross sectional view illustrating a state in which a connector is inserted into a connector slot of an ECU.
Figure 6:
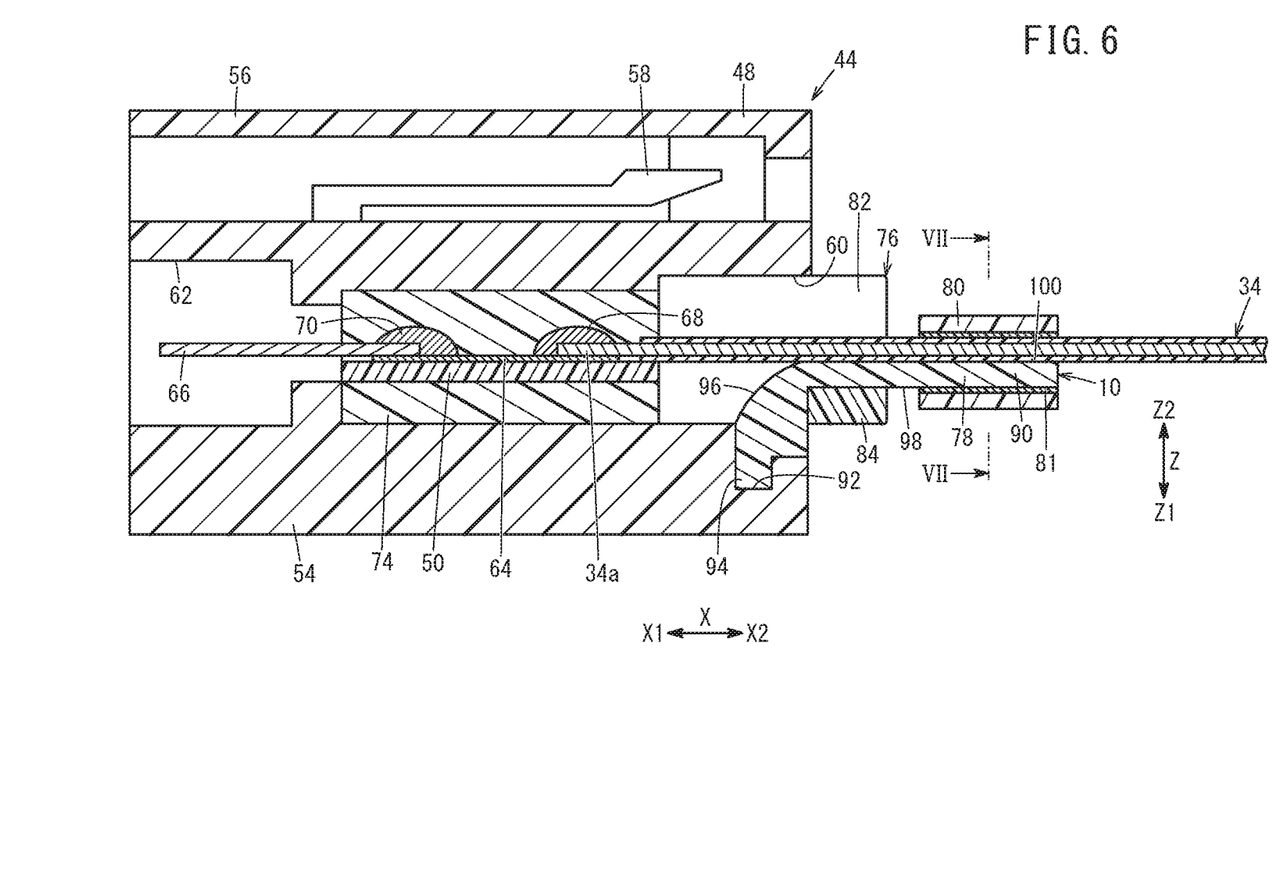
FIG. 6 is a vertical cross sectional view showing the cable fixing structure.

As shown in FIGS. 4 to 6, the connector 44 includes a connector housing 48, and a substrate 50 (printed wiring board) provided in the connector housing 48. The connector housing 48 has a substantially rectangular parallelepiped shape. For example, the connector housing 48 is formed by joining a first cover 54 and a second cover 56 that are separated in the thickness direction (indicated by an arrow Z) of the flat cable 34.

The substrate 50 is provided on the first cover 54, and a claw 58 is provided in the second cover 56 (see FIG. 6). When the connector 44 is inserted into the connector insertion slot 42, the claw 58 is engaged with the casing 40 of the ECU 38. A first opening 60 and a second opening 62 are formed in the connector housing 48. The terminal end of the flat cable 34 is inserted into the first opening 60, and the connector 46 of the ECU 38 can be inserted into the second opening 62.

In FIGS. 5 and 6, the substrate 50 is a printed wiring board made of insulating material such as glass epoxy, and a conductive pattern 64 is printed on a surface of the substrate 50. A plurality of the lead wires 34a exposed at the terminal end of the flat cable 34 are soldered (joined) to the conductive pattern 64 of the substrate 50. Further, a plurality of connection terminals 66 are soldered to the conductive pattern 64 of the substrate 50. That is, each of the lead wires 34a of the flat cables 34 is joined to the conductive pattern 64 of the substrate 50 by a soldering part 68 (joint portion), and each of the connection terminals 66 is joined to the conductive pattern 64 of the substrate 50 by a soldering part 70. Stated otherwise, the connection terminals 66 and the lead wires 34a are connected together by the conductive pattern 64 of the substrate 50.

For example, each of the connection terminals 66 is a connection pin made of copper or copper alloy having gold plating on its surface. These connection terminals 66 can be fitted to fitting holes 72 formed in the connector 46 of the ECU 38 (see FIG. 5). The substrate 50 is sealed hermetically by a potting portion 74 in the connector housing 48 (see FIG. 6). Therefore, even if foreign matters such as water, dust, etc. are infiltrated from the first opening 60 and the second opening 62 into the connector housing 48, it is possible to prevent the foreign matters from being adhered to the soldering parts 68, 70, and/or the conductive pattern 64, etc.

As shown in FIGS. 4 to 6, the connector housing 48 and the flat cable 34 are fixed together by the cable fixing structure 10. The cable fixing structure 10 includes a support part 76 inserted into the first opening 60 of the connector housing 48, a fixing part 78 (retainer) provided for the support part 76, and a heat contraction tube 80 for holding the flat cable 34 by the fixing part 78.

The support part 76 is fixed to the connector housing 48. The support part 76 includes two side walls 82 which are spaced from, and which face each other in the width direction of the flat cable 34 (in the direction indicated by the arrow Y), and a coupling portion 84 coupling the side walls 82 together. The flat cable 34 is provided between these side walls 82. The side walls 82 restrict displacement of the flat cable 34 relative to the fixing part 78 in the width direction of the flat cable 34.

An expansion 86 is provided at an outer end of each of the side walls 82 exposed to the outside of the connector housing 48. The expansions 86 are expanded in the width directions of the flat cable 34 so as to be away from each other. The coupling portion 84 couples the bottoms at the ends of the side walls 82 (in the direction indicated by an arrow X2) on a side opposite to the side where the connector terminals 66 are provided (in the direction indicated by an arrow X1).

As shown in FIG. 4, the fixing part 78 includes a leg 88 provided in the first opening 60, and a protrusion 90 protruding from the leg 88 in the direction indicated by the arrow X2. The leg 88 extends in the direction indicated by the arrow Y, and the leg 88 is positioned between the two side walls 82. A surface of the leg 88 oriented in the direction indicated by the arrow X2 contacts the coupling portion 84

(see FIG. 6). A projection 94 is provided on a surface of the leg 88 oriented in the direction indicated by the arrow Z1. The projection 94 is inserted into a recess 92 formed in an inner surface of the first cover 54.

A clearance surface 96 is formed in a surface of the leg 88 oriented in the direction indicated by the arrow Z2. The clearance surface 96 is oriented in the direction in the direction indicated by the arrow X1, and curved (extended) in the direction indicated by the arrow Z1. The clearance surface 96 is not limited to the curved shape (R shape). For example, the clearance surface 96 may have a flat surface oriented in the direction indicated by the arrow X1, and inclined in the direction indicated by the arrow Z1.

Figure 7:
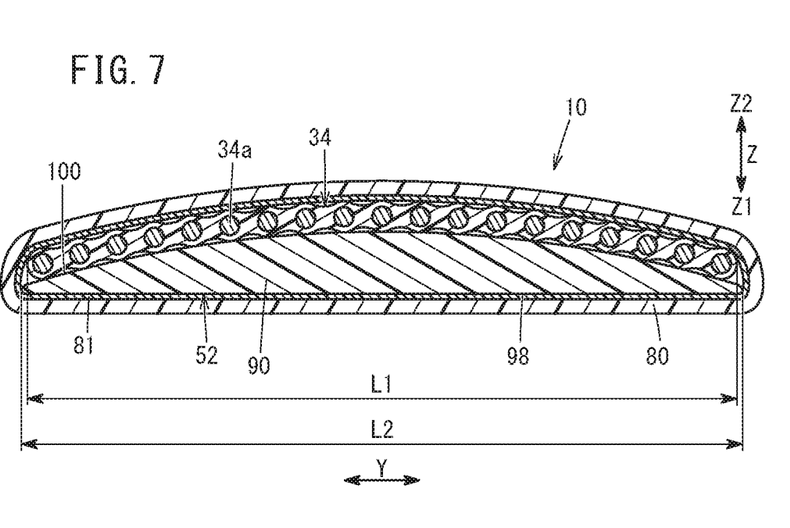
FIG. 7 is a lateral cross sectional view taken along a line VII-VII in FIG. 6.

The protrusion 90 is a plate piece protruding in the direction indicated by the arrow X2 from an end of the leg 88 in the direction indicated by the arrow Z2 to the outside of the connector housing 48. A surface of the protrusion 90 oriented in the direction indicated by the arrow Z1 is a flat surface 98 which contacts the coupling portion 84. As shown in FIG. 7, a surface of the protrusion 90 oriented in the direction indicated by the arrow Z2 is a convexly curved surface 100. The flat cable 34 is overlapped with the protrusion 90 along the convexly curved surface 100 in the direction indicated by the arrow Y. The convexly curved surface 100 is continuous with the clearance surface 96.

The convexly curved surface 100 is expanded toward the flat cable 34 in lateral cross section which is perpendicular to the direction in which the flat cable 34 extends. Stated otherwise, the convexly curved surface 100 is curved in an arc shape. In the embodiment of the present invention, the convexly curved surface 100 is formed by one circular arc shape in lateral cross section. Alternatively, the convexly curved surface 100 may be formed by combining a plurality of circular arcs each having a different radius of curvature. The convexly curved surface 100 protrudes toward the flat cable 34 to the greatest extent at the center in the width direction of the protrusion 90.

For example, the heat contraction tube 80 is made of polyolefin, fluorocarbon based polymer, or thermoplastic elastomer. The heat contraction tube 80 is provided around the protrusion 90 and the flat cable 34, and presses the flat cables 34 against the convexly curved surface 100. That is, the flat cable 34 is curved in an arc shape along the convexly curved surface 100 over the entire width of the flat cable 34. In this state, the flat cable 34 is sandwiched and held between the convexly curved surface 100 and the heat contraction tube 80.

The width L1 of the flat cable 34 in the state where the flat cable 34 is pressed against the convexly curved surface 100 by the heat contraction tube 80 is substantially the same as, or slightly smaller than the width L2 of the protrusion 90 (convexly curved surface 100). In this manner, it is possible to reduce the width of the protrusion 90, and bring the flat cable 34 into contact with the convexly curved surface 100 over the entire width of the flat cable 34.

When the heat contraction tube 80 is in the compressed state, the heat contraction tube 80 has a flat shape in lateral cross section. Specifically, the part of the heat contraction tube 80 covering the flat surface 98 of the protrusion 90 extends straight along the flat surface 98, and the part of the heat contraction tube 80 covering the flat cable 34 is curved along the flat cable 34 which is curved in the arc shape.

For example, the heat contraction tube 80 has the compression ratio of 60% or more. Specifically, in the state before heat contraction, the heat contraction tube 80 is formed in a substantially oval shape, and when the heat contraction tube 80 is compressed by about 60%, the long diameter of the heat contraction tube 80 becomes the width L2 of the protrusion 90 (convexly curved surface 100). In this case, it is possible to easily provide the protrusion 90 and the flat cable 34 inside the heat contraction tube 80 before contraction.

Adhesive is coated on the inner surface of the heat contraction tube 80. Thus, the heat contraction tube 80 is securely fixed to the flat cable 34 and the fixing part 78 through an adhesive layer 81.

In the embodiment of the present invention, during operation (power operation) of the fuel cell stack 12, as shown in FIGS. 2 and 3, each of the power generation cells 14 is connected to the ECU 38 through the flat cable 34 connected to the cell voltage detection terminal 30. Therefore, the ECU 38 detects the cell voltage (electromotive force) of each of the power generation cells 14 during power generation.

In the embodiment of the present invention, the flat cable 34 is pressed against the convexly curved surface 100 by the heat contraction tube 80. Therefore, when a pulling force is applied to the flat cable 34 in a longitudinal direction of the flat cable 34, it is possible to reduce the stress applied to the soldering part 68 between the flat cable 34 and the substrate 50, and suppress interruption of electrical connection between the flat cable 34 and the substrate 50.

Further, the convexly curved surface 100 is expanded toward the flat cable 34 in cross section which is perpendicular to the direction in which the flat cable 34 extends, in the area where the flat cable 34 and the fixing part 78 are overlapped with each other. In this manner, it is possible to reliably press the flat cable 34 by the heat contraction tube 80 by the uniform pressure in the width direction of the convexly curved surface 100.

Further, in the state where the flat cable 34 is curved in an arc shape along the convexly curved surface 100 over the entire width of the flat cable 34, the flat cable 34 is sandwiched and held between the convexly curved surface 100 and the heat contraction tube 80. Further, the part of the heat contraction tube 80 covering the flat cable 34 is curved along the flat cable 34 curved in the arc shape. In the structure, since it is possible to bring the heat contraction tube 80 into contact with the flat cable 34 efficiently, it is possible to improve the holding force of holding the flat cable 34 by the fixing part 78.

Further, the fixing part 78 includes the protrusion 90 in the form of the plate piece having the convexly curved surface 100 on one side in the thickness direction. In the structure, it is possible to reduce the size of the fixing part 78 in the thickness direction of the flat cable 34, and use the heat contraction tube 80 having a relatively small size.

In the embodiment of the present invention, the adhesive layer 81 (adhesive) is provided between the heat contraction tube 80 and the flat cable 34. Therefore, it is possible to securely fix the heat contraction tube 80 to the flat cable 34.

Further, the convexly curved surface 100 and the heat contraction tube 80 are positioned outside the connector housing 48. Therefore, it is possible to fix the flat cable 34 to the fixing part 78 easily. Further, it is possible to suppress transmission of heat produced during heat contraction operation of the heat contraction tube 80 to the substrate 50.

Moreover, the fixing part 78 has the clearance surface 96 extending from the convexly curved surface 100 to the terminal end of the flat cable 34, in a direction away from the flat cable 34. In the structure, it is possible to suppress the situation where the flat cable 34 contacts the portion of the fixing part 78 other than the convexly curved surface 100, and excessive bending stress is applied to the flat cable 34.

In the embodiment of the present invention, the flat cable 34 is electrically connected to the cell voltage detection terminal 30 of each of the power generation cells 14, and the connector 44 is electrically connected to the connector 46 of the ECU 38 as the cell voltage detection device. Therefore, it is possible to reliably detect the cell voltage of each of the power generation cells 14.

Further, the connector housing 48 includes the first cover 54 and the second cover 56 that are separated in the thickness direction of the flat cable 34. The substrate 50 and the fixing part 78 are provided on the first cover 54. In the structure, it is possible to fix the connector housing 48 and the flat cable 34 together effectively.

Further, the clearance surface 96 is formed by the curved surface which is continuous with the convexly curved surface 100. Therefore, it is possible to easily form the clearance surface 96.

The embodiment of the present invention is not limited to the above structure. For example, the fixing part 78 may be formed integrally with the support part 76. The connection terminal 66 may extend in a direction perpendicular to the substrate 50. In this case, the connector 46 of the ECU 38 is connected to the connection terminal 66 in the direction perpendicular to the substrate 50.

The cable fixing structure according to the present invention is not limited to the above described embodiment. It is a matter of course that various structures can be adopted without deviating from the gist of the present invention.

What is claimed is:

1. A cable fixing structure for fixing together a connector housing containing a substrate and a flat cable joined to the substrate, the cable fixing structure comprising:
   a fixing part provided for the connector housing, and including a convexly curved surface; and
   a heat contraction tube configured to surround the flat cable and the fixing part, and press the flat cable against the convexly curved surface,
   wherein the flat cable is electrically connected to a cell voltage detection terminal of each of power generation cells of a fuel cell stack; and
   a connection terminal is joined to the substrate, and the connection terminal is configured to be electrically connected to a connector of a cell voltage detection device.

2. The cable fixing structure according to claim 1, wherein the convexly curved surface is expanded toward the flat cable in cross section which is perpendicular to a direction in which the flat cable extends, in an area where the flat cable and the fixing part are overlapped with each other.

3. The cable fixing structure according to claim 1, wherein, in a state where the flat cable is curved in an arc shape along the convexly curved surface over an entire width of the flat cable, the flat cable is sandwiched and held between the convexly curved surface and the heat contraction tube; and
   part of the heat contraction tube covering the flat cable is curved along the flat cable curved in the arc shape.

4. The cable fixing structure according to claim 1, wherein the fixing part includes a plate piece having the convexly curved surface on one side in a thickness direction.

5. The cable fixing structure according to claim 1, wherein an adhesive layer is provided between the heat contraction tube and the flat cable.

6. The cable fixing structure according to claim 1, wherein the convexly curved surface and the heat contraction tube are positioned outside the connector housing.

7. The cable fixing structure according to claim 1, wherein the fixing part has a clearance surface extending from the convexly curved surface to the substrate, in a direction away from the flat cable.

8. The cable fixing structure according to claim 1, wherein the connector housing includes a first cover and a second cover that are separated in the thickness direction of the flat cable; and
   the substrate and the fixing part are provided at the first cover.

9. The cable fixing structure according to claim 7, wherein the clearance surface comprises a curved surface continuous with the convexly curved surface.

* * * * *